Patented Mar. 5, 1940

2,192,687

UNITED STATES PATENT OFFICE 2,192,687

PROCEDURE FOR TREATING RESIDUAL SULPHURIC ACID LIQUORS

Ray Leroy McCleary, Richardson Park, Del., assignor to E. I. du Pont de Nemours & Company, Wilmington, Del., a corporation of Delaware No Drawing. Application January 3, 1938, Serial No. 183,127

7 Claims. (Cl. 23—172)

This invention relates to the treatment of residual acid liquors to render the same useful in the production of valuable pigment products. More particularly, the invention concerns the treatment of by-product sulphuric acid liquors obtained from titaniferous ore decomposition processes, in order to render such liquors useful in the production of valuable white pigments, especially calcium sulphate and titanium oxide.

In the preparation of titanium pigments, it is customary to treat a titaniferous ore, such as ilmenite or rutile, with strong sulphuric acid, leach out the soluble titanium and iron sulphates obtained, remove most of the iron sulphate by crystallization, and then hydrolyze the titanium sulphate. The precipitated titanium dioxide is filtered out, washed, dried, calcined and ground, being then ready for use as a pigment. The filtrate from the hydrolysis step (known as "waste acid") contains in excess of 10% by weight of sulphuric acid, from about 1% to 3% of titanyl sulphate, from about 5% to 30% or more of ferrous sulphate, and small amounts of other impurities. Due to its very dilute and impurity-contaminated character, the recovery of sulphuric acid from such residual liquor has proved very difficult, and, if successful, unprofitable.

Sulphuric acid costs constitute a major item of expense in titaniferous ore decomposition and it will be apparent that loss occurring by reason of waste acid discard is a serious economic factor in such processes. Likewise, another serious factor comprises the nuisance problem which such waste acid production affords. It has been proposed that this waste acid may be employed in the production of calcium sulphate, i. e., by reacting the acid with a slurry of lime or limestone. It has also been proposed to utilize it in the production of titanium dioxide pigment, i. e., by concentrating the waste acid through evaporation or otherwise, and using the resultant concentrate in the first step of this pigment manufacture. The calcium sulphate or titanium dioxide obtained in such processes, however, differs very materially from that produced in processes employing relatively pure or virgin sulphuric acid. Thus, in the instance of waste acid use, both pigments are characterized by an objectionable off-color yellow or yellowish-brown tint which renders them wholly unfit for commercial exploitation or use.

For certain uses of calcium sulphate, it is highly desirable that it be prepared in as finely divided form as possible. This is particularly true if the product is to be used as a pigment or extender, in combination with other pigments, either directly as precipitated, or after being given suitable heat treatment. In the preparation of calcium sulphate, for example, by mixing solutions of calcium chloride and virgin sulphuric acid, it is precipitated in the form of comparatively large needle-like crystals. A similar product is obtained by treating a water suspension of calcium hydrate with relatively pure sulphuric acid. In such instances, and in order to obtain desired micron particle size, prolonged wet grinding must be resorted to, during which the calcium sulphate, due to water contact, has a tendency to hydrate to acicular gypsum, to become unfit for pigment use.

It has been found, and the present invention accordingly provides, that if the waste acid from said titaniferous ore-decomposition operations is first subjected to treatment with a relatively small amount of an alkali metal compound and the resultant precipitate is then removed, the acid filtrate obtained will be especially useful for producing marketable white $CaSO_4$ and $TiO_2$ pigments.

Accordingly, in its broader aspects the invention comprises treating residual sulphuric acid solutions with a suitable amount of a soluble alkali metal compound, or mixtures of the same, allowing the same to react therewith to form a precipitate, and then separating said precipitate from the treated acid.

In a more specific embodiment, the invention comprises treating a residual acid liquor from a titaniferous ore-decomposition operation, containing from about 10 to 40% by weight of $H_2SO_4$, with an amount of soluble alkali metal salt ranging from about 0.025 gram atoms to 3.5 gram atoms of alkali metal per liter of residual liquor to form a precipitate, and then separating said precipitate from the treated acid.

In its preferred embodiment, the invention comprises treating a sulphuric acid residual liquor from a titanium oxide pigment producing process (containing from about 10–40% of $H_2SO_4$ by weight), with sodium chloride or sulphate, ranging in amount in gram atoms of sodium per liter of residual acid of from about two to five times the reciprocal of the percentage by weight of the $H_2SO_4$ present in such liquor.

In one adaptation of the invention, relatively small amounts of sodium sulphate are added at room temperature to a residual acid liquor, the resultant mixture being then thoroughly agitated for a relatively short period of time (usually not in excess of one hour) to speed the reaction and insure its completion. Practically, and in order to precipitate the major proportion of impurities present, the amount of sodium salt employed ranges preferably in gram atoms of sodium per liter of acid or liquor from about twice to five times the reciprocal of the percentage by weight of $H_2SO_4$ present in the liquor. Such preferred amounts usually precipitate about 85–90% of the total amount of precipitate that would be formed, should a larger excess of treatment be resorted to. The precipitate obtained is then filtered or otherwise separated from the treated liquor, the latter being then employed directly in a reaction for producing calcium sulphate, such as indicated; or, if desired, may be employed in the first step of an ilmenite ore attack process for the production of titanium dioxide.

In order that the invention may be more clearly understood, the following examples are given, each of which is merely illustrative in character and in no wise in limitation of the invention's underlying concepts:

*Example I*

To 1 liter, at room temperature, of waste sulphuric acid from the hydrolysis step in the production of titanium dioxide from ilmenite, which weighed 1280 grams and contained 296.23 grams of free sulphuric acid, 15.98 grams of titanyl sulphate and 66.73 grams of ferrous sulphate, i. e., 23.14 per cent of free sulphuric acid, 1.25 per cent of titanyl sulphate and 5.21 per cent of ferrous sulphate, was added 10 grams of sodium sulphate, i. e. was added to 1 liter of waste acid, sodium sulphate in the amount in gram atoms of sodium of 3.26 times the reciprocal of 23.14, the percentage by weight of sulphuric acid in said waste acid. The mixture was agitated vigorously for 1 hour at room temperature, and the resulting precipitate, approximating 12 grams, was filtered out. This acid was used in the preparation of calcium sulphate by the process described in U. S. Patent 2,006,342. In carrying out this preparation, a suspension of a finely divided anhydrite seed was prepared from 60° Bé. acid and lime slurry and 35 grams of this $CaSO_4$ was added as a seed material to the liter of treated acid, while holding the latter at the boiling temperature. Lime slurry was added to prepare more of the calcium sulphate by neutralization. Calcium sulphate or anhydrite prepared from waste acid so treated and filtered was found to be perfectly white in color and substantially equivalent in every respect to a calcium sulphate pigment prepared from fresh or virgin sulphuric acid. The calcium sulphate product also exhibited other desirable pigmentary properties, being excellent in texture and high in tinting strength and oil absorption values. Its particle size was very fine, averaging about 0.5 micron, with at least 90% being not greater than 1.5 microns. Due to its excellent pigmentary character and fine particle size, it was especially useful as a pigment or extender.

*Example II*

Treated and filtered waste acid described in Example I was concentrated by evaporation to 82% sulphuric acid content, and mixed with a suitable amount of 98% virgin sulphuric acid. This mixture was then employed in the conventional manner in the treatment of ilmenite to produce pigment titanium dioxide. The color of the resultant pigment was definitely better than that prepared under comparable conditions, but from a similar mixture of 98% virgin sulphuric acid and 82% sulphuric acid obtained by evaporating untreated waste acid. Said titanium dioxide pigment was also found to be essentially equivalent to that obtained under like conditions, but wherein virgin or fresh sulphuric acid was employed in the attack.

The present invention possesses advantages not obtainable by previously known methods in that it makes possible the production of markedly white pigments, such as calcium sulphate, titanium oxide pigments, and the like, from a relatively worthless compound obtained in the manufacture of titanium dioxide. The color values of the pigment products obtained in the instant invention will be found to be definitely superior to those obtained in similar processes, but employing waste acid or liquors. Such pigment products will be found to be at least essentially equal to those of similar products made in the same manner, but employing virgin or fresh sulphuric acid.

The pronounced effect on the color of the white pigment products obtained in the instant invention will be readily apparent by comparing oil pastes of the white pigments obtained from untreated waste acid or liquors, and the pigments made from acids or liquors treated in accordance with this invention. Such pastes may be prepared by mulling the pigment with acid refined linseed oil of acid number 12.5 to form a thick paste. The sample to be tested and the standard are placed beside each other on a colorless microscope slide 2″ x 3″ in daubs about 1½″ x 1″. The daubs should be in sharp contact without air bubbles in the contact line and should be sufficiently thick to cut off all transmitted light. The pastes are then graded under north sky light for difference in appearance. The minimum perceptible difference in brightness is called one point of color. The sample is graded in full points from the standard. Differences in tint are important. In the case of white pigments, a sample of yellowish tint is penalized in the grading to the extent of one or more points, as it is barely perceptible or clearly evident. On the other hand, a bluish tint relative to the standard is desirable and consequently modifies the brightness grading upward. This procedure is essentially the one described by J. E. Booge and H. E. Eastlack in the Paint, Oil and Chemical Review, April 9, 1924.

In addition to the excellent texture, color, tinting strength and oil absorption values exhibited by the calcium sulphate product obtainable by employing the treated acid of the present invention, it will be found that on drying such product by calcination or other heat treatment, the anhydrous product obtained will be found to be free from objectionable acicular gypsum particles, and will exhibit the unique, unexpected and very valuable property of disintegrating spontaneously into fine particle size insoluble anhydrite, the particles thereof ranging from about .5 to 2 microns, and 90% of the particles of which will be below substantially 1.5 microns. Thus, a very fine and pigment-useful calcium sulphate product is produced.

As has been indicated, the invention is particularly adapted to the treatment of waste acid liquors procured in the hydrolysis step in ilmenite ore decomposition processes for obtaining titanium oxide or hydroxide. The acid filtrate from such processes contains not less than about 10% nor more than about 45% by weight of $H_2SO_4$.

The amount of sodium salt required to treat a given liquor to render it useful for pigment production will depend, of course, upon the previous history of the liquor and its acid concentration and, in general, will vary inversely to said acid concentration. In any given instance, the requisite amount of salt treatment may be readily determined by trial. Thus, appreciable effects are obtained by treating waste acid with soluble sodium salts in the amount in gram atoms of sodium per liter of waste acid as low as the reciprocal of the percentage of sulphuric acid by weight present in such acid. For increased and more pronounced effects, soluble sodium salts in amount in gram atoms of sodium per liter of waste acid ranging to as high as about eight times the reciprocal of the percentage of sulphuric acid by weight in the acid may be used, if desired. Ordinarily, however, and as has been stated, it will be found sufficient to add to the waste acid soluble sodium salts in the amount in gram atoms of sodium per liter of waste acid of from about twice to about five times the reciprocal of the percentage by weight of sulphuric acid in such waste acid. Such amount will usually be sufficient to precipitate from about 85–90% of the total amount of precipitate that would be formed by addition of a large excess of the salt. While the addition of somewhat larger amounts of salts and in excess of eight times the reciprocal of the percentage by weight of sulphuric acid present, is contemplated, the use of amounts in excess of this latter figure is not preferred or desirable because such excessive amounts adversely affect the color and strength of the pigment during subsequent calcination of pigments made from the treated acid. An added disadvantage of excess salt employment is incurred by reason of the difficulty encountered in washing the resultant pigment to remove such soluble salts therefrom and avoid objectionable fritting during pigment calcination. Accordingly, in its preferred adaptation, the invention contemplates the employment of salt ratios to less than the excess extent indicated when pigment color and strength are of prime importance, although of course, if these attributes are not essential and other pigment properties, such as texture and fine particle sizes are desired, one may beneficially employ excess amounts of soluble salts ranging to as high as 35 times the reciprocal of the percentage by weight of sulphuric acid in the residual liquor.

While the invention has been described in its particular embodiment employing the preferred sodium salt, sodium sulphate, it will be obvious that other waste acid or residual liquor treating agents may be usefully employed, including any of the soluble salts of the monovalent alkali metals, i. e., sodium, potassium or lithium, and particularly the sulphates, chlorides and chlorates thereof. The beneficial effects arising by reason of the employment of such treating agents appears to be specific to the alkali metal sodium, potassium or lithium ions. The anion associated with the metallic element appears to have no appreciable effect or benefit as long as it forms with the alkali cation a compound which is soluble in water. For equal effectiveness, it will be found preferable to employ an amount of potassium salt in excess of substantially twice the molar amount of the sodium salt. For this reason, therefore, it will be found preferable to employ the sodium salt, particularly the sulphate or chloride. In the instance of the phosphate, a very gelatinous precipitate is formed, which renders filtering very difficult. Sodium chloride, because of its low cost and production of a precipitate containing slightly larger crystal structure, is easy to filter. However, in certain instances it will liberate hydrochloric acid in the waste acid, which may attack any lead present in the equipment and care must be taken in this direction when this type of treating agent is employed.

I claim as my invention:

1. A process for rendering a residual sulphuric acid-containing liquor from titanium salt hydrolysis and titanium oxide precipitation useful for calcium sulphate and titanium pigment production, comprising subjecting said liquor to treatment with a soluble alkali metal salt from the group consisting of the chloride, sulphate, phosphate and chlorate, and discarding the resultant precipitate.

2. A process for rendering a residual liquor obtained from hydrolysis and precipitation of titanium oxide useful for pigment production, comprising treating said liquor containing from about 10–40% by weight of $H_2SO_4$ with an amount of soluble alkali metal salt from the group consisting of the chloride, sulphate, phosphate and chlorate ranging from .025 gram atoms to 3.5 gram atoms of the alkali metal per liter of residual liquor, and removing the resultant precipitate.

3. A process for rendering a residual liquor obtained from hydrolysis and precipitation of titanium oxide useful for pigment production, comprising treating said liquor contaaining from about 10–40% by weight of $H_2SO_4$ with an amount of sodium salt from the group consisting of the chloride, sulphate, phosphate and chlorate, ranging from .025 gram atoms to 3.5 gram atoms of sodium per liter of residual liquor, and removing the resultant precipitate.

4. A process for rendering a residual liquor obtained from hydrolysis and precipitation of titanium oxide useful for pigment production, comprising treating said liquor containing from about 10–40% by weight of $H_2SO_4$ with an amount of soluble alkali salt from the group consisting of the chloride, sulphate, phosphate and chlorate, ranging in gram atoms of alkali metal per liter of residual acid from about two to eight times the reciprocal of the percentage by weight of $H_2SO_4$ present in said liquor, and removing the resultant precipitate.

5. A process for rendering a residual liquor obtained from hydrolysis and precipitation of titanium oxide useful for pigment production, comprising treating said liquor containing from about 10–40% by weight of $H_2SO_4$ with an amount of a soluble sodium salt from the group consisting of the chloride, sulphate, phosphate and chlorate, ranging in gram atoms of sodium per liter of residual acid from about two to eight times the reciprocal of the precentage by weight of $H_2SO_4$ present in said liquor, and removing the resultant precipitate.

6. A process for rendering a residual liquor obtained from the hydrolysis and precipitation of titanium oxide useful for pigment production comprising treating said liquor while the same contains from about 10–40% by weight of $H_2SO_4$ with an amount of sodium chloride ranging in grame atoms of sodium per liter of residual liquor from about 2 to 5 times the reciprocal of the percentage by weight of $H_2SO_4$ present in said liquor, and removing the resultant precipitate.

7. A process for rendering a residual liquor obtained from the hydrolysis and precipitation of titanium oxide useful for pigment production comprising treating said liquor while the same contains from about 10-40% by weight of $H_2SO_4$ with an amount of sodium sulphate ranging in gram atoms of sodium per liter of residual liquor from about 2 to 5 times the reciprocal of the percentage by weight of $H_2SO_4$ present in said liquor, and removing the resultant precipitate.

RAY L. McCLEARY.